(12) United States Patent
Sangroya et al.

(10) Patent No.: US 11,720,614 B2
(45) Date of Patent: Aug. 8, 2023

(54) METHOD AND SYSTEM FOR GENERATING A RESPONSE TO AN UNSTRUCTURED NATURAL LANGUAGE (NL) QUERY

(71) Applicant: Tata Consultancy Services Limited, Mumbai (IN)

(72) Inventors: Amit Sangroya, Gurgaon (IN); Gautam Shroff, Gurgaon (IN); Chandrasekhar Anantaram, Gurgaon (IN); Mrinal Rawat, Gurgaon (IN); Pratik Saini, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/753,514

(22) PCT Filed: Mar. 4, 2020

(86) PCT No.: PCT/IB2020/051827
§ 371 (c)(1),
(2) Date: Mar. 4, 2022

(87) PCT Pub. No.: WO2021/044222
PCT Pub. Date: Mar. 11, 2021

(65) Prior Publication Data
US 2022/0342919 A1    Oct. 27, 2022

(30) Foreign Application Priority Data

Sep. 6, 2019    (IN) .............................. 201921036051

(51) Int. Cl.
*G06F 16/33*     (2019.01)
*G06F 16/332*    (2019.01)
*G06F 40/20*     (2020.01)

(52) U.S. Cl.
CPC ...... *G06F 16/3344* (2019.01); *G06F 16/3329* (2019.01); *G06F 40/20* (2020.01)

(58) Field of Classification Search
CPC .................................................. G06F 16/3344
See application file for complete search history.

(56) References Cited

U.S. PATENT DOCUMENTS 6,675,159 B1 *   1/2004   Lin ....................... G06F 40/205
8,150,872 B2     4/2012   Bernard
(Continued)

OTHER PUBLICATIONS

Sukthankar, Nandan et al., "A Natural Language Statement to SQL Query Generator", Computer Science, Date: Jul. 2017, Publisher: ACL, https://aclanthology.org/P17-3004.pdf.
(Continued)

*Primary Examiner* — Van H Oberly
(74) *Attorney, Agent, or Firm* — Finnegan, Henderson, Farabow, Garrett & Dunner LLP

(57) ABSTRACT

For various applications (for example, a Virtual Assistant), mechanisms that are capable of collecting user queries and generating responses are being used. While such systems handle structured queries well, they struggle to or fail to interpret an unstructured Natural Language (NL) query. The disclosure herein generally relates to data processing, and, more particularly, to a method and a system for generating responses to unstructured Natural Language (NL) queries. The system collects at least one NL query as input at a time, and generates a sketch, where the sketch is a structured representation of the unstructured NL query. Further by processing the sketch, the system generates one or more database queries. The one or more database queries are then used to search in one or more associated databases and to retrieve matching results, which are then used to generate response to the at least one NL query.

6 Claims, 5 Drawing Sheets

(56) References Cited

U.S. PATENT DOCUMENTS

| | | | |
|---|---|---|---|
| 10,956,666 B2 | 3/2021 | Vescovi et al. | |
| 2003/0018632 A1* | 1/2003 | Bays | G06F 16/30 |
| 2016/0378747 A1 | 12/2016 | Orr et al. | |
| 2017/0132199 A1 | 5/2017 | Vescovi et al. | |
| 2018/0032930 A1 | 2/2018 | Kolb et al. | |
| 2020/0311070 A1* | 10/2020 | Yan | G06N 20/00 |

OTHER PUBLICATIONS

Chandra, Yohan, "Natural language interfaces to databases", Master Thesis, Date: 2006, Publisher: Semanticschor, https://digital.library.unt.edu/ark:/67531/metadc5474/m2/1/high_res_d/thesis.pdf.

Saebu, Tomas Stein, "Natural language interfaces to databases", Computer Science, Date: Aug. 2015, Publisher: Semanticschor, https://www.duo.uio.no/bitstream/handle/10852/47661/thesis_tomas.pdf?isAllowed=y&sequence=7.

Pruski, Piotr et al., "TiQi: Answering Unstructured Natural language trace Queries", Computer Science, Date: Sep. 2015, Publisher: Springer, http://sarec.nd.edu/Preprints/TiQiToolDemo.pdf.

International Search Report and Written Opinion dated Aug. 13, 2020, in International Application No. PCT/IB2020/051827; 13 pages.

* cited by examiner

METHOD AND SYSTEM FOR GENERATING A RESPONSE TO AN UNSTRUCTURED NATURAL LANGUAGE (NL) QUERY

CROSS-REFERENCE TO RELATED APPLICATIONS AND PRIORITY

The present application is a U.S. National Stage Filing under 35 U.S.C. § 371 and claims priority from International Application No. PCT/IB2020/051827, filed on Mar. 4, 2020, which application claims priority from Indian Patent Provisional Application No. 201921036051, filed on Sep. 6, 2019. The entire contents of the aforementioned applications are incorporated herein by reference.

TECHNICAL FIELD

The disclosure herein generally relates to data processing, and, more particularly, to a method and a system for generating responses to unstructured Natural Language (NL) queries.

BACKGROUND

In various applications, systems are required to collect user queries, interpret, and identify and perform action(s) in response to the collected user queries. For example, chatbots are being used in various websites so as to provide at least some basic information regarding services being offered, to the users. The chatbot allows a user to interact with the website/platform, mostly by presenting a pre-configured list of questions or data pointers to the user. In response to a question asked by a user, the system provides appropriate response.

Such questions being asked by the user can be broadly classified as structured questions and unstructured questions. While structured questions are comparatively easy for the system to interpret and understand, interpreting the unstructured questions is a challenge. For example, when the question being asked by the user is an unstructured Natural Language (NL) query, processing terms/keyword(s) alone might not be sufficient as meaning of the terms/keyword(s) may change based on context in which the question is being asked.

Certain mechanisms are being employed to process natural language queries. However based on the approaches taken, capability of such mechanisms in effectively interpreting the NL queries and preparing responses can vary.

SUMMARY

Embodiments of the present disclosure present technological improvements as solutions to one or more of the above-mentioned technical problems recognized by the inventors in conventional systems. For example, in one embodiment, a method is provided. In this method, at least one query from a user as input is fetched using one or more hardware processors, wherein the at least one query is in unstructured natural language format. Further, a sketch corresponding to the fetched at least one query is generated using the one or more hardware processors (102), wherein the sketch is a structured representation of the at least one unstructured query. Further, the sketch is transformed to one or more database queries, using the one or more hardware processors. At least one database is queried using the one or more database queries, using the one or more hardware processors. Further a response to the at least one unstructured query is generated based on one or more results obtained by querying the at least one database, using the one or more hardware processors.

In another aspect, a system (100) is provided. The system includes one or more hardware processors, one or more communication interfaces, and one or more memory modules storing a plurality of instructions. The plurality of instructions when executed cause the one or more hardware processors to fetch at least one query from a user, as input, wherein the at least one query is in unstructured natural language format. The system further generates a sketch corresponding to the fetched at least one query, wherein the sketch is a structured representation of the at least one unstructured query. The system then transforms the sketch to one or more database queries, and queries at least one database using the one or more database queries. The system further generates a response to the at least one unstructured query based on one or more results obtained by querying the at least one database.

In yet another aspect, a non-transitory computer readable medium for generating response to an unstructured Natural Language (NL) query is provided. The non-transitory computer readable medium generates the response to the unstructured NL query by executing the following method: In this method, at least one query from a user as input is fetched using one or more hardware processors, wherein the at least one query is in unstructured natural language format. Further, a sketch corresponding to the fetched at least one query is generated using the one or more hardware processors (102), wherein the sketch is a structured representation of the at least one unstructured query. Further, the sketch is transformed to one or more database queries, using the one or more hardware processors. At least one database is queried using the one or more database queries, using the one or more hardware processors. Further a response to the at least one unstructured query is generated based on one or more results obtained by querying the at least one database, using the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
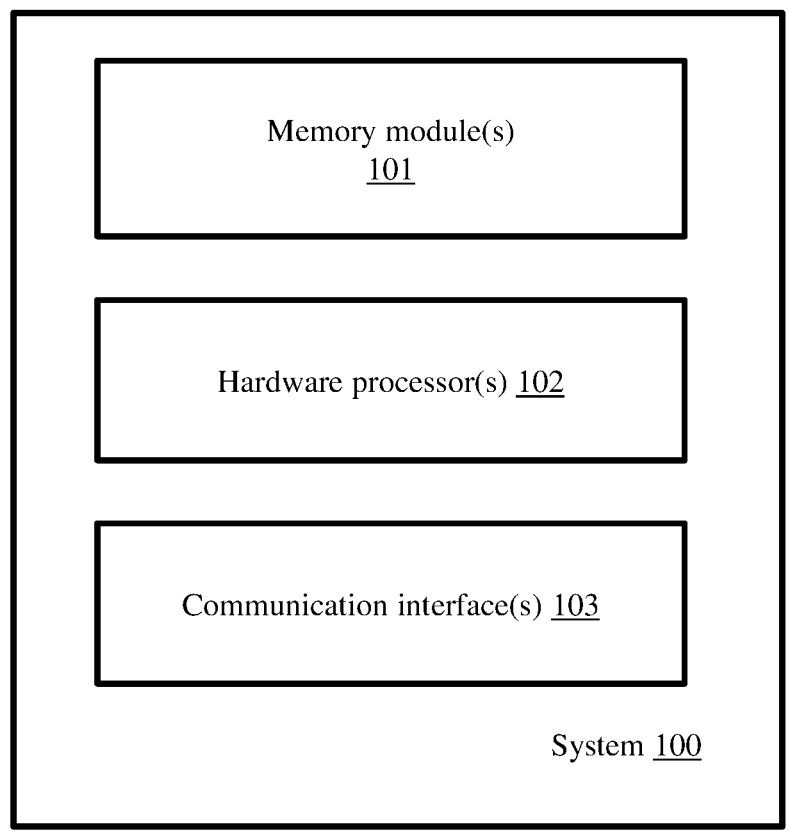
FIG. 1 illustrates an exemplary system for processing unstructured Natural Language (NL) query, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system for processing unstructured Natural Language (NL) query, according to some embodiments of the present disclosure. The system 100 includes one or more memory modules 101, one or more hardware processors 102, and one or more communication interfaces 103.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory module(s) 101. The memory module (s) 101 are further configured to store a plurality of instructions, which when executed, cause the one or more hardware processor(s) 102 to perform different actions associated with the unstructured Natural Language (NL) query (the unstructured NL query is referred to as 'query' henceforth) processing being handled by the system 100. The memory module(s) 101 can be further configured to store any data, associated with processing of the query and response generation being handled by the system 100. For example the data such as but not limited to the one or more queries being received/collected from a user, corresponding sketch generated, corresponding database queries generated, results fetched, responses generated, and so on can be stored in the one or more memory modules 101. The memory module 101 is further configured to store a plurality of data models generated using one or more appropriate machine learning techniques, at least for the purpose of 1. generating a sketch corresponding to a query received, 2. transforming the sketch to one or more database queries, and 3. identifying data in one or more reference databases matching the one or more database queries. In an embodiment, the plurality of data models are sequence to sequence Bidirectional Long Short Term Memory (LSTM) models along with a time-distributed dense layer.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 are configured to perform data and control signal processing, at different stages of the query processing, as required.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) can be configured to provide one or more channels with appropriate protocols, for the system 100 to communicate with one or more external systems. For example, the communication interface(s) 103 interacts and collects inputs required for collecting and processing the query and for further generating the response(s) to the query. The communication interface(s) 103 may further provide appropriate user interface(s) for an authorized user to interact with the system 100 and provide/ask one or more queries (which is in the unstructured natural language format). The communication interface(s) 103 can be further configured to provide one or more channels for different components of the system 100 to interact with each other and perform data and/or control transfer.

The system 100 processes a query received in three steps:
1. Generating Sketch from Query:

Processing of the query to generate the sketch is explained by considering an example. Consider the query "How many employees work in project Curie?". Steps involved in generating the sketch for the aforementioned query are explained below:

In a first step, Predicates (otherwise called 'target concepts') are identified and extracted from the query using an appropriate data model (a predicate finder model) from the plurality of data models. In case of database query language, the predicates refer to 'SELECT' part of the query. In an embodiment, in order to identify the predicates, the query is initially transformed to a vector format and is fed as input to the predicate finder model. For example, the query "How many employees work in project Curie?" is annotated as {0 0 A 0 0 B 0}. In this example, 'employee' and 'project' are identified as the predicates.

In the next step, the system 100 finds values/entities in the query, using an entity discovery model of the plurality of models. At this stage, the system 100 takes output from previous step and replaces the identified predicates with a <predicate> token. The query is then represented as: {How many <predicate> work in <predicate> Curie}. From this sentence, all Parts of Speech (PoS) tags are extracted by the system 100 and then all the PoS tags that are stop words are ignored (during further processing of the query) by the system 100. Further, using any suitable technique (for example, a sliding window technique), n-grams are prepared from remaining part of the query, where the n-gram refers to continuous sequence of n items from the query. If more than one n-grams are present, then the n-gram which corresponds to an entity in the data and having a highest score is picked by the system 100. In the example query considered, 'Curie' is picked as an entity by the system 100.

In the next step the system 100 finds type of the predicates and values at a node or table level. For example, in the aforementioned query, 'employee' is a PERSON, and hence the type of 'employee' is PERSON. Information pertaining to the 'type' allows the system 100 to accurately interpret the queries in some circumstances. For example, Consider the following sentences:

What is employee ID of Washington?

List all stores in Washington

Here in the first sentence 'Washington' refers to name of a person whereas in the second sentence 'Washington' refers to a place. Here the type information allows the system 100 to interpret that in the first sentence 'Washington' refers to a name and that in the second sentence 'Washington' refers to a place. After identifying the entities, the system 100 may mark the entities with a token <value>.

In the next step, the system 100 identifies one or more attribute types in the query. This may be done using an attribute type finder model from the plurality of models. This model identifies one or more attribute types of the predicates and values. For example, consider the following sentences:

What is employee ID of May?

List all employees hired in May

In these examples, even though 'May' in first sentence and in second sentence may be present in a same table 'Employee', they have different attributes. In this scenario, the attribute information can be used by the system 100 to distinguish between May (a name) and May (a month). The attribute type information helps the system 100 to improve accuracy in interpreting context/intent of the query.

In the next step, the system 100 finds attribute values in the query, if any. This may be done using a predicate value finder model from the plurality of models. In some queries the attribute values may be already present. For example, consider the following sentences:

How many employees work in curie?

How many employees work in project curie?

From the second sentence, it is clear that 'Curie' is a project. The predicate value finder model binds the predicate to the corresponding value or entity i.e. in this example 'project' to 'curie'. This model may replace predicates with tag <predicate> and entities with tag <value>. Then the second sentence may be read as {How many <predicate> work in <predicate> <value>}, and is annotated as [0 0 0 0 0 A A].

In the next step, the system 100 uses an aggregators & operators model from the plurality of models to determine aggregators and operators for the predicates and entities respectively. A few examples of aggregate functions that are supported by the system 100 are count, groupby, min, max, sum, sort, and so on. Similarly, a few examples of operators supported by the system 100 are =, <, >, < >, <=, >=, and so on. The second sentence that is represented as {How many <predicate> work in <predicate> <value>} is annotated as {0 0 count 0 0 0 equal}. It is also inferred by the system 100 that the predicate 'project' and entity 'Curie' are related as [project]=[Curie].

Further, by using data from all the data models, the system 100 generates the sketch corresponding to the query, as:

Sketch={Select, Conditions},

Where

Select={pred_hint:=employees

Type:=person

Attr_type:=name

Aggregation:=count}

Conditions={pred_hint:=project value:=Curie type:=PROJECT

Attr_type:=name}

As can be seen, the sketch has a predicate part (P) and a condition part (C).

2. Transforming Sketch to Database Queries:

The sketch S is represented as S={P, C}, where P is a set $\{p_1, p_2, p_3, \ldots p_n\}$ and each $p_i$ is $\{n_i, a_i, h_i, g_i\}$, where $n_i$=node/table level type of predicate $p_i$ $a_i$=attribute/predicate level type of predicate $p_i$ $h_i$=Natural Language (NL) hint for $p_i$ $g_i$=aggregation information for the predicate $p_i$ Similarly, C is a set $\{c_1, c_2, c_3, \ldots c_n\}$, where each $c_i$ is a set $\{n_i, a_i, h_i, g_i, o_i\}$, where $n_i$=node/table level type of predicate $p_i$ involved in condition $c_i$ $a_i$=attribute/predicate level type of predicate $p_i$ involved in condition $c_i$ $h_i$=Natural Language (NL) hint for $p_i$ involved in condition $c_i$ $g_i$=aggregation information for the predicate $p_i$ involved in condition $c_i$ $o_i$=operator involved in the condition $c_i$ The sketch S contains information about all predicates identified, which indicates list of attributes that needs to be extracted from tables of a table T that stores information. Similarly the sketch S contains information about all conditions which gives similar information about data in rows of T. To transform the sketch to the one or more database queries, the predicate part (P) and condition part (C) of the sketch are separately analyzed.

Analyzing Predicate Part (P) of the Sketch S:

While analyzing the predicate part of the sketch, the system 100 checks for semantic similarity of the predicates $p_1$ in the sketch, with that of the predicates in each table of type $n_i$ and attribute type $a_i$. After identifying all matching predicates, the system 100 identifies corresponding tables as matching tables.

Analyzing Condition Part (C) of the Sketch S:

For each condition $c_i$ of C, the system 100 identifies predicates matching value $v_i$ of the condition $c_i$, wherein matching predicates are identified based on values of $h_i$, $a_i$, and $n_i$ of the predicates. After identifying the matching predicates, the system 100 identifies the corresponding tables as matching tables.

In the next step, the system 100, out of all the identified matching tables, the system 100 identifies a set of unique tables (U) for the corresponding sketch. In some scenarios, the number of matching tables may be one. In some other scenarios, the number of matching tables may be more than one (i.e. len(U)>1). When len(U)>1, then the system 100 computes a final relation (R) between the tables. This is done by finding a shortest path between the unique tables identified as matching the query. For example, consider that for the query "How many employees work in project Curie" the unique tables identified are 'Employee' and 'Project'. Then the system 100 identifies the shortest path between these two tables in terms of a joint 'works in' (i.e. as Employee-→'works in'→Project). Further, using the relationship R along with the operator information, the aggregator information and any other data from the sketch S, the system 100 computes one or more database queries.

For example, consider the query "How many employees in each project". By analyzing this query the system 100 identifies that the count is on emp_id and predicate is 'project'. From this the system 100 further identifies the corresponding unique tables (T) involved and computes the relation R between the identified unique tables. Then the corresponding database query maybe:

SELECT COUNT(emp_id), proj_name
FROM Employee INNER JOIN Project
ON (pid_fk=pid) GROUP BY proj_name The one or more database queries are then used to query one or more databases, and matching data is identified. The matching data is then used to generate a response to the query from the user.

Figure 2:
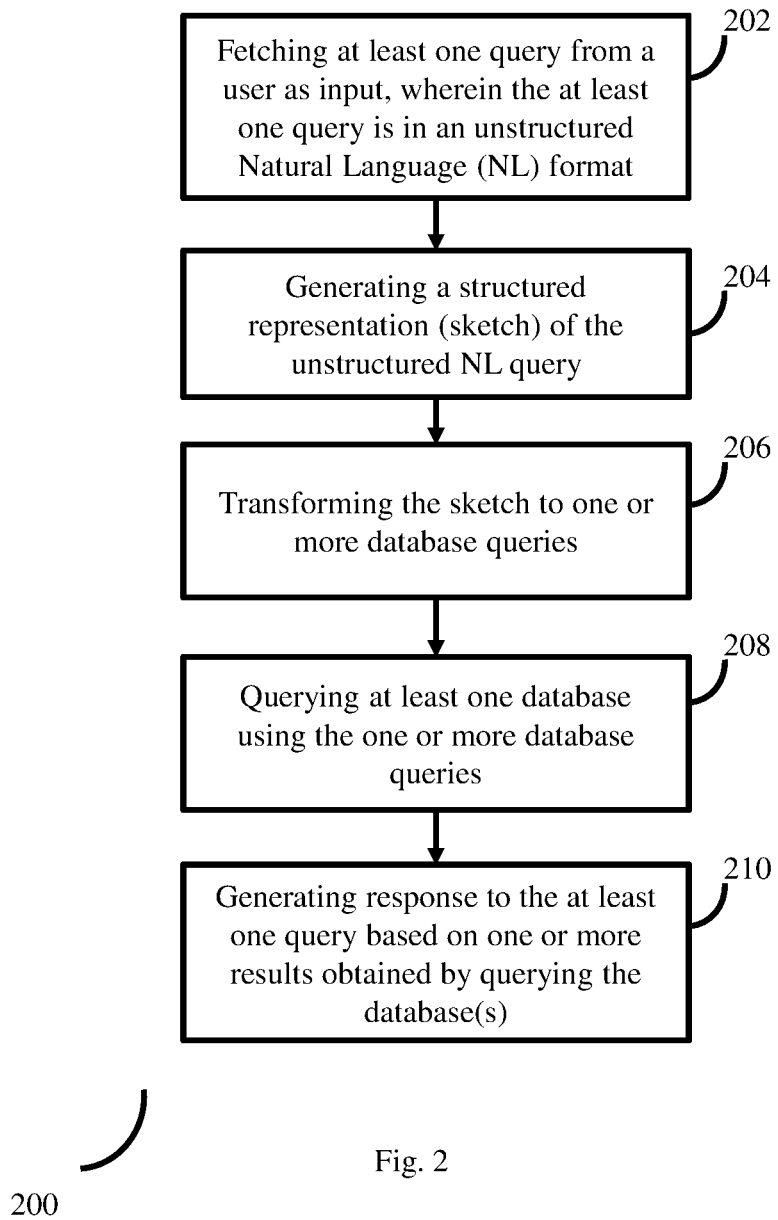
FIG. 2 is a flow diagram depicting steps involved in the process of generating response to the unstructured Natural Language (NL) query, using the system of FIG. 1, according to some embodiments of the present disclosure.

FIG. 2 is a flow diagram depicting steps involved in the process of generating response to the unstructured Natural Language (NL) query, using the system of FIG. 1, according to some embodiments of the present disclosure. The system 100 fetches/collects (202) the query as an input, from the user. As the query is in an unstructured format, the system 100 processes the query to generate (204) a sketch, wherein the sketch is a structured representation of the query. Then the sketch is transformed (206) to one or more database queries. Using the one or more database queries, the system 100 queries (208) one or more reference databases and fetches matching results. The matching results are then used by the system 100 to generate (210) a response to the query received, which in turn can be provided to the user.

Figure 3A:
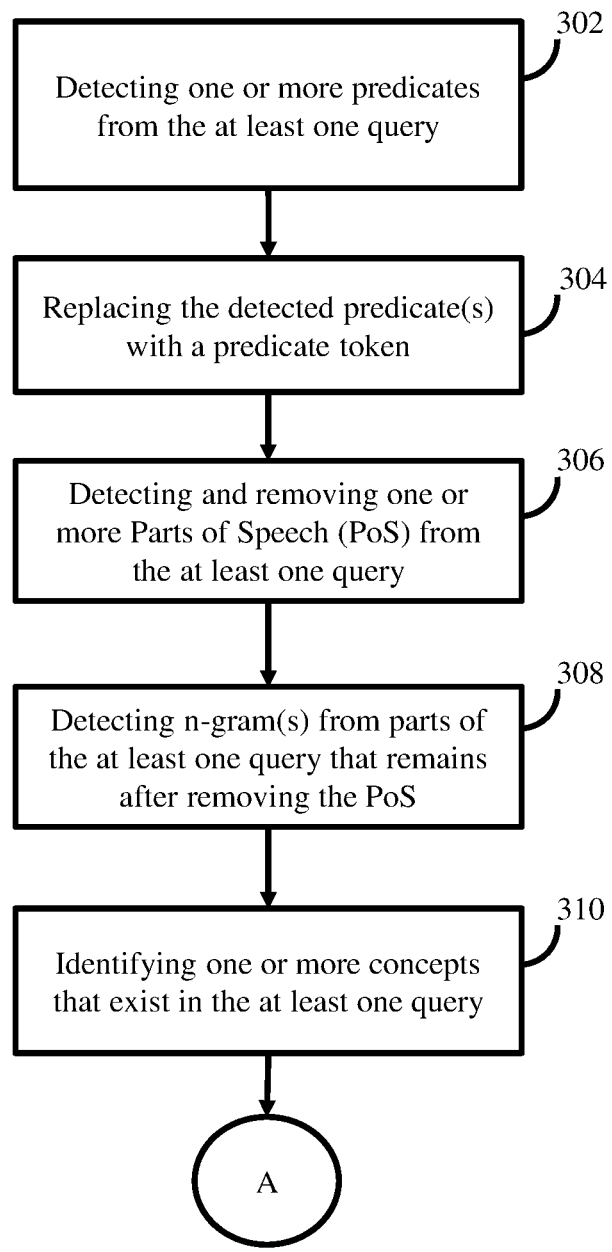
FIGS. 3A and 3B (collectively referred to as FIG. 3) are flow diagrams depicting steps involved in the process of generating a sketch corresponding to the unstructured Natural Language (NL) query, using the system of FIG. 1, in accordance with some embodiments of the present disclosure.
Figure 3B:
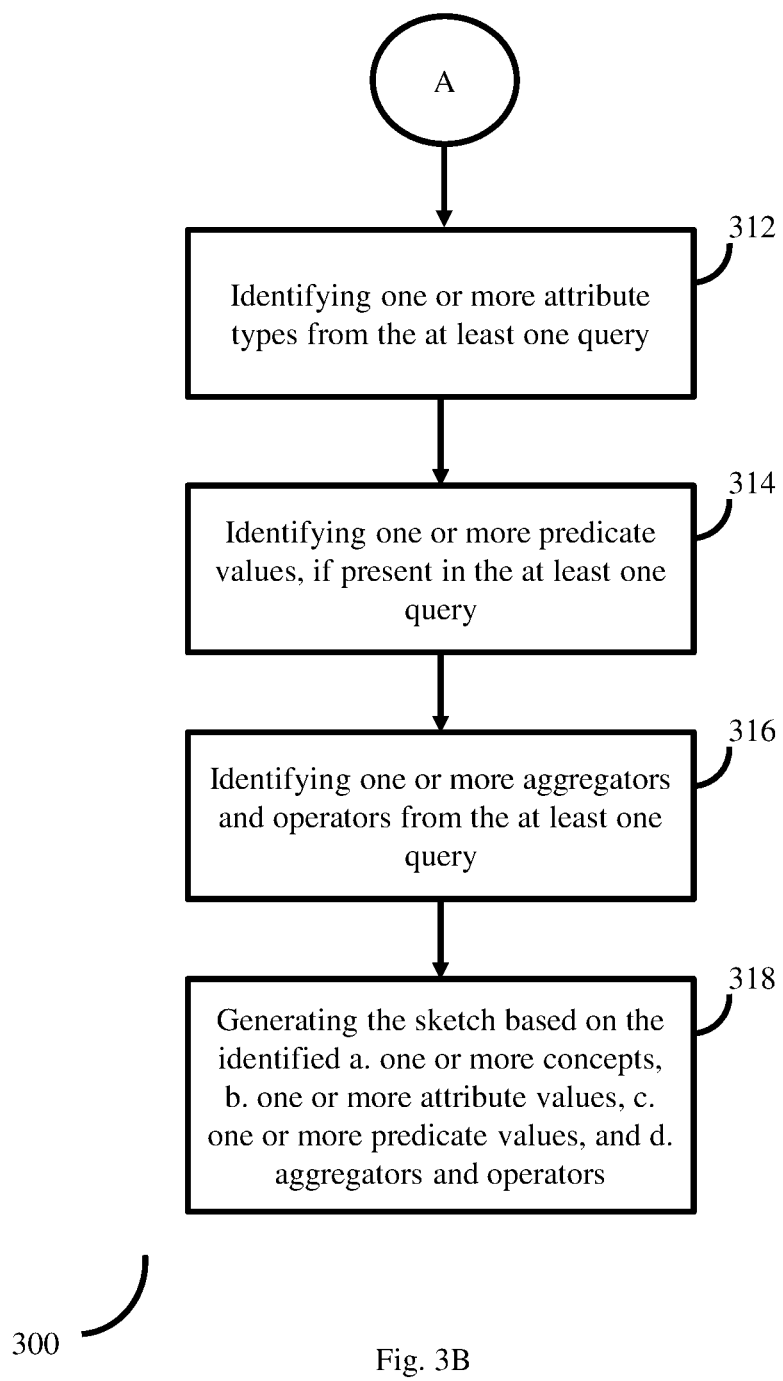

FIGS. 3A and 3B (collectively referred to as FIG. 3) are flow diagrams depicting steps involved in the process of generating a sketch corresponding to the unstructured Natural Language (NL) query, using the system of FIG. 1, in accordance with some embodiments of the present disclosure. In order to generate the sketch for a query received, the system 100 initially detects (302) one or more predicates from the query. Then the system 100 replaces (304) all identified predicates with a predicate token (<predicate>). Then the system 100 detects and removes (306) one or more Parts of Speech (PoS) tags from the query. From the parts of the query that remains after removing the PoS tags, the system 100 detects (308) n-grams, which are then processed to identify (310) one or more concepts that exist in the query. Further the system 100 identifies (312) one or more attribute types from the query. In the next step the system 100 identifies (314) one or more predicate values, if present, from the query, and then identifies (316) one or more aggregators and operators from the query. At all the aforementioned steps, the system 100 uses appropriate data model from a plurality of data models to identify and extract relevant data. Finally the data from all the models are collected (i.e. the one or more concepts, the one or more attribute values, the one or more predicate values, and the aggregators and operators) and processed by the system 100 to generate (318) the sketch.

Figure 4:
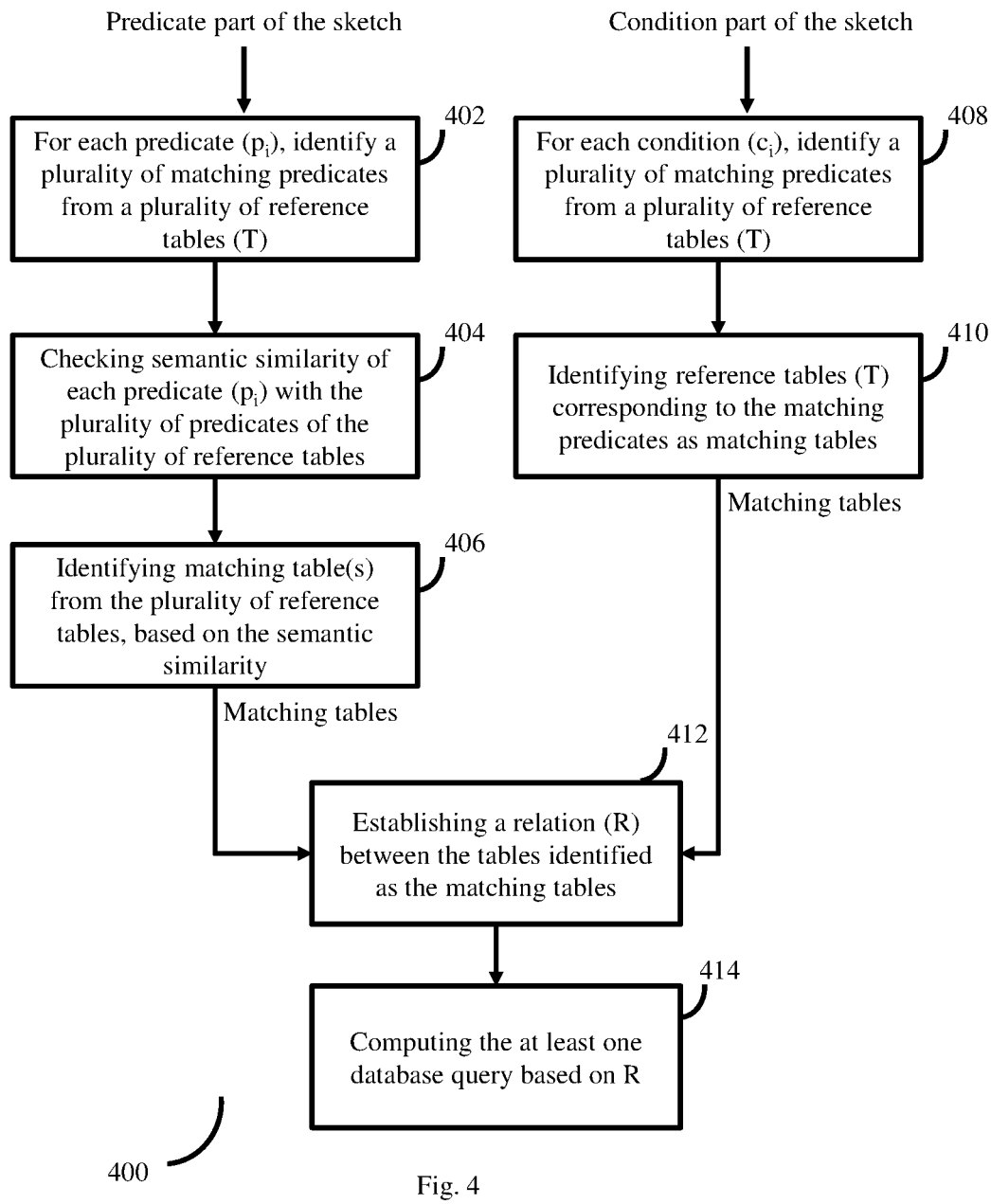
FIG. 4 is a flow diagram depicting steps involved in the process of transforming the sketch to at least one database query, using the system of FIG. 1, according to some embodiments of the present disclosure.

FIG. 4 is a flow diagram depicting steps involved in the process of transforming the sketch to at least one database query, using the system of FIG. 1, according to some embodiments of the present disclosure. The sketch comprises of two parts: a predicate part and a conditions part. In order to transform the sketch to corresponding database queries, the system analyzes the predicate part and the conditions part separately.

While analyzing the predicate part of the sketch, for each predicate pi, the system 100 identifies (402) a plurality of matching predicates from a plurality of reference tables (T). The system 100 then checks (404) semantic similarity of each predicate pi with the plurality of matching predicates from the plurality of reference tables. Based on the semantic similarity, some predicates from the reference tables are identified and shortlisted as matching predicates, and the system 100 then identifies (406) table (T) each of the matching predicates belong to, as matching tables.

Similarly while analyzing the condition part of the sketch S, for each condition ci, the system 100 identifies (408) a plurality of matching predicates from a plurality of reference tables (T). After identifying the matching predicates, the system 100 identifies the corresponding tables (T) as the matching tables.

In the next step, the system 100 considers the matching tables (from step 406 and step 410), and establishes (412) a relationship (R) between the tables identified as the matching tables. Further, based on the relationship (R), the system 100 computes (414) at least one database query.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of response generation for an unstructured Natural Language query. The embodiment, thus provides a mechanism to generate a structured representation (sketch) of the unstructured query. Moreover, the embodiments herein further provides a mechanism to transform the sketch to one or more database queries which can be used to query one or more databases.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A method, comprising:
   fetching at least one query from a user as an input, using one or more hardware processors, wherein the at least one query is in an unstructured natural language format;
   generating a sketch corresponding to the fetched at least one query, using the one or more hardware processors, wherein the sketch is a structured representation of the at least one query;
   transforming the sketch to one or more database queries, using the one or more hardware processors, wherein the sketch comprises of a predicate part and a condition part,
      transforming the sketch to the one or more database queries further comprises:
         analyzing the predicate part of the sketch, for each predicate (pi) of the predicate part of the sketch, wherein analyzing further comprises:
            identifying a plurality of predicates (pi) in a plurality of reference tables (T), which match a table type (ni) and an attribute type (ai) of the predicate from the predicate part of the sketch;
            checking semantic similarity of each predicate (pi) of the sketch with the plurality of predicates of the plurality of reference tables; and
            identifying at least one table of the plurality of reference tables as a matching table, based on the semantic similarity;
         analyzing the condition part of the sketch, for each condition (ci) in the condition part (C) of the sketch, wherein the analyzing the condition part further comprises:
            identifying a plurality of predicates (pi) in a plurality of reference tables (T), which match a table type (ni) and an attribute type (ai) of the condition (ci) from the predicate part of the sketch; and
            identifying reference tables of the plurality of predicates (pi) which match each condition (ci) in the condition part (C) of the sketch, as the matching table;
         establishing a relationship (R) between the tables identified as the matching table; and
         computing at least one database query of the one or more database queries based on the relationship (R);
   querying at least one database using the one or more database queries, using the one or more hardware processors; and
   generating a response to the at least one query based on one or more results obtained by querying the at least one database, using the one or more hardware processors.

2. The method as claimed in claim 1, wherein generating the sketch corresponding to the fetched at least one query comprises:
   detecting one or more predicates from the at least one query;
   replacing the detected one or more predicates with a predicate token;
   detecting and removing one or more Parts of Speech (PoS) from the at least one query;
   generating one or more n-grams from parts of the at least one query that remains after removing the one or more PoS;
   identifying one or more concepts that exist in the at least one query;
   identifying one or more attribute types from the at least one query;
   identifying one or more predicate values, if present in the at least one query;
   identifying one or more aggregations and operators from the at least one query; and
   generating the sketch based on the identified one or more concepts, the identified one or more attribute types, the identified one or more predicate values, and the identified one or more aggregations and operators.

3. A system, comprising:
   one or more hardware processors;
   one or more communication interfaces; and
   one or more memory modules storing a plurality of instructions, wherein the plurality of instructions when executed cause the one or more hardware processors to:
      fetch at least one query from a user, as an input, wherein the at least one query is in an unstructured natural language format;
      generate a sketch corresponding to the fetched at least one query, wherein the sketch is a structured representation of the at least one query;
      transform the sketch to one or more database queries, wherein the sketch comprises of a predicate part and a condition part, the transform of the sketch to the one or more database queries further comprises:

analyzing the predicate part of the sketch, for each predicate (pi) of the predicate part of the sketch, wherein analyzing further comprises:

identifying a plurality of predicates (pi) in a plurality of reference tables (T), which match a table type (ni) and an attribute type (ai) of the predicate from the predicate part of the sketch;

checking semantic similarity of each predicate (pi) of the sketch with the plurality of predicates of the plurality of reference tables; and identifying at least one table of the plurality of reference tables as a matching table, based on the semantic similarity;

analyzing the condition part of the sketch, for each condition (ci) in the condition part (C) of the sketch, wherein the analyzing the condition part further comprises:

identifying a plurality of predicates (pi) in a plurality of reference tables (T), which match a table type (ni) and an attribute type (ai) of the condition (ci) from the predicate part of the sketch; and identifying reference tables of the plurality of predicates (pi) which match each condition (ci) in the condition part (C) of the sketch, as the matching table;

establishing a relationship (R) between the tables identified as the matching table; and computing at least one database query of the one or more database queries based on the relationship (R);

query at least one database using the one or more database queries; and generate a response to the at least one unstructured query based on one or more results obtained by querying the at least one database.

4. The system as claimed in claim 3, wherein the system generates the sketch corresponding to the fetched at least one query by:

detecting one or more predicates from the at least one query;

replacing the detected one or more predicates with a predicate token;

detecting and removing one or more Parts of Speech (PoS) from the at least one query;

generating one or more n-grams from parts of the at least one query that remains after removing the one or more PoS;

identifying one or more concepts that exist in the at least one query;

identifying one or more attribute types from the at least one query;

identifying one or more predicate values, if present in the at least one query;

identifying one or more aggregations and operators from the at least one query; and generating the sketch based on the identified one or more concepts, the identified one or more attribute types, the identified one or more predicate values, and the identified one or more aggregations and operators.

5. A non-transitory computer readable medium, the non-transitory computer readable medium generates a response to an unstructured natural language (NL) query, by:

fetching at least one query from a user as an input, using one or more hardware processors, wherein the at least one query is in an unstructured natural language format;

generating a sketch corresponding to the fetched at least one query, using the one or more hardware processors, wherein the sketch is a structured representation of the at least one query;

transforming the sketch to one or more database queries, using the one or more hardware processors, wherein the sketch comprises of a predicate part and a condition part, transforming the sketch to the one or more database queries further comprises:

analyzing the predicate part of the sketch, for each predicate (pi) of the predicate part of the sketch, wherein analyzing further comprises:

identifying a plurality of predicates (pi) in a plurality of reference tables (T), which match a table type (ni) and an attribute type (ai) of the predicate from the predicate part of the sketch;

checking semantic similarity of each predicate (pi) of the sketch with the plurality of predicates of the plurality of reference tables; and identifying at least one table of the plurality of reference tables as a matching table, based on the semantic similarity;

analyzing the condition part of the sketch, for each condition (ci) in the condition part (C) of the sketch, wherein the analyzing the condition part further comprises:

identifying a plurality of predicates (pi) in a plurality of reference tables (T), which match a table type (ni) and an attribute type (ai) of the condition (ci) from the predicate part of the sketch; and identifying reference tables of the plurality of predicates (pi) which match each condition (ci) in the condition part (C) of the sketch, as the matching table;

establishing a relationship (R) between the tables identified as the matching table; and computing at least one database query of the one or more database queries based on the relationship (R);

querying at least one database using the one or more database queries, using the one or more hardware processors; and generating a response to the at least one unstructured query based on one or more results obtained by querying the at least one database, using the one or more hardware processors.

6. The non-transitory computer readable medium as claimed in claim 5, wherein the non-transitory computer readable medium generates the sketch corresponding to the fetched at least one query, by:

detecting one or more predicates from the at least one query;

replacing the detected one or more predicates with a predicate token;

detecting and removing one or more Parts of Speech (PoS) from the at least one query;

generating one or more n-grams from parts of the at least one query that remains after removing the one or more PoS;

identifying one or more concepts that exist in the at least one query;

identifying one or more attribute types from the at least one query;
identifying one or more predicate values, if present in the at least one query;
identifying one or more aggregations and operators from the at least one query; and
generating the sketch based on the identified one or more concepts, the identified one or more attribute types, the identified one or more predicate values, and the identified one or more aggregations and operators.

* * * * *